United States Patent
Ono

(10) Patent No.: US 8,308,099 B2
(45) Date of Patent: Nov. 13, 2012

(54) SEAT BELT RETRACTOR

(75) Inventor: Junya Ono, Yokohama (JP)

(73) Assignee: Autoliv Development AB, Vargarda (SE)

( * ) Notice: Subject to any disclaimer, the term of this patent is extended or adjusted under 35 U.S.C. 154(b) by 326 days.

(21) Appl. No.: 12/669,280

(22) PCT Filed: Jul. 14, 2008

(86) PCT No.: PCT/JP2008/062668
§ 371 (c)(1),
(2), (4) Date: Jan. 15, 2010

(87) PCT Pub. No.: WO2009/011325
PCT Pub. Date: Jan. 22, 2009

(65) Prior Publication Data
US 2010/0193622 A1    Aug. 5, 2010

(30) Foreign Application Priority Data
Jul. 18, 2007   (JP) .................................. 2007-187116

(51) Int. Cl.
*B60R 22/40*   (2006.01)

(52) U.S. Cl. ................. 242/384.1; 242/384.4; 242/384.5

(58) Field of Classification Search .................. 242/384, 242/384.1, 384.4, 384.5, 384.6; 280/806, 280/807; 297/478–480; 73/493
See application file for complete search history.

(56) References Cited

U.S. PATENT DOCUMENTS

| | | | | |
|---|---|---|---|---|
| 4,018,400 A | * | 4/1977 | Henderson | 242/384.5 |
| 4,287,398 A | * | 9/1981 | Ziv et al. | 200/61.45 R |
| 4,319,721 A | * | 3/1982 | Kawai et al. | 242/384.5 |
| 4,413,794 A | * | 11/1983 | Weman | 242/384.5 |
| 4,619,417 A | * | 10/1986 | Teraoka et al. | 242/384.6 |
| 4,684,077 A | * | 8/1987 | Kurtti et al. | 242/384.2 |
| 4,726,540 A | * | 2/1988 | Ches et al. | 242/384.1 |
| 5,568,941 A | * | 10/1996 | Woydick et al. | 280/806 |
| 6,247,365 B1 | * | 6/2001 | Smithson et al. | 73/514.37 |

FOREIGN PATENT DOCUMENTS

| | | |
|---|---|---|
| JP | 60-86974 U | 5/1993 |
| JP | 10157569 A | 6/1998 |
| JP | 2002321595 A | 11/2002 |
| JP | 2005-531460 A | 10/2005 |

* cited by examiner

*Primary Examiner* — Michael Mansen
*Assistant Examiner* — Scott Haugland
(74) *Attorney, Agent, or Firm* — Brinks Hofer Gilson & Lione

(57) ABSTRACT

A seatbelt retractor includes an acceleration sensor. The acceleration sensor includes a sensor case having a supporting surface which is maintained horizontal. A self-standing inertia body whose bottom surface is placed on the supporting surface is installed inside the sensor case in a self-standing condition, and which tilts when a horizontal acceleration is exerted. An actuating member which, in accordance with a tilting movement of the self-standing inertia body, activates a lock mechanism to lock the extraction of the seat belt. An outer contour of a contact area where the supporting surface of the sensor case and the bottom surface of the self-standing inertia body are in surface contact is configured such that a distance from a center axis of the self-standing inertia body to the outer contour differ, in a horizontal plane, in a first direction and in a second direction orthogonal to the first direction.

10 Claims, 5 Drawing Sheets

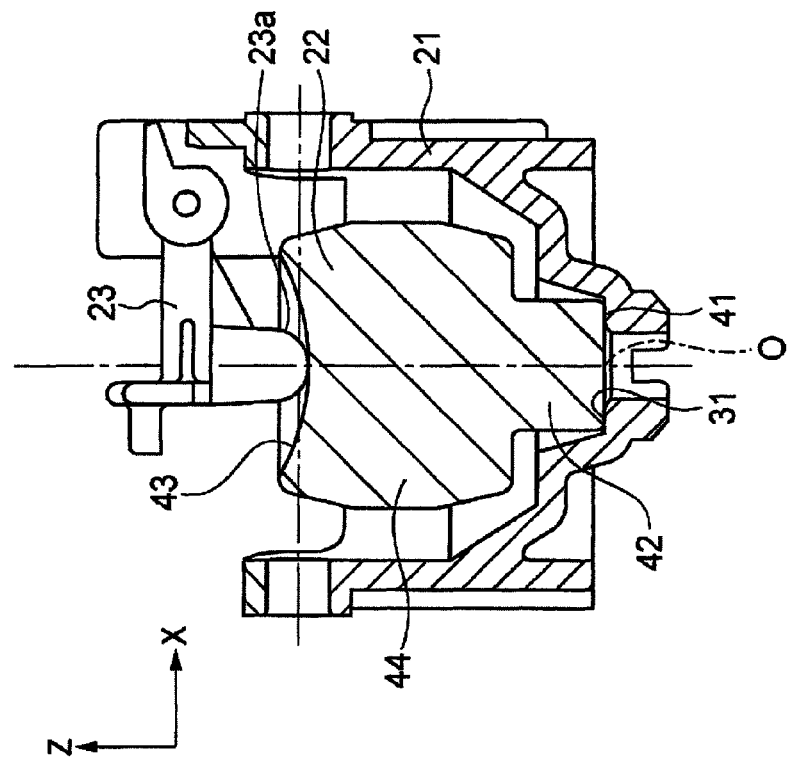
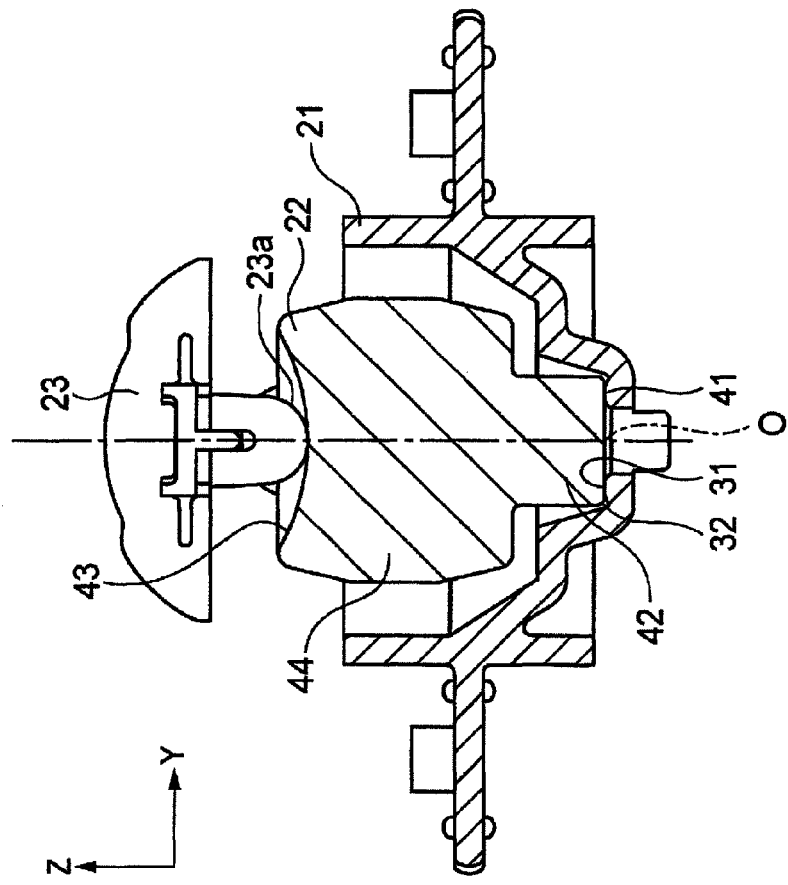

SEAT BELT RETRACTOR

CROSS REFERENCE TO RELATED APPLICATIONS

This application claims priority to Japanese Patent Application Serial Number 2007-187116 filed Jul. 18, 2007, and to PCT Patent Application Serial Number PCT/JP2008/062668 filed Jul. 14, 2008.

TECHNICAL FIELD

The present invention relates to a seat belt retractor which uses an acceleration sensor of a self-standing inertia body type.

BACKGROUND ART

A seat belt apparatus equipped on a vehicle restrains an occupant on a vehicle seat with a seat belt extracted from a seat belt retractor inside a seatback to protect the occupant at the time of vehicle collision or the like. In the seat belt retractor, when an acceleration exceeding a certain value acts in a horizontal direction at the time of vehicle collision or the like, an acceleration sensor detects the acceleration to activate a seat belt lock mechanism, thereby disabling the extraction of the seat belt. As an inertia body used in the acceleration sensor, there is known a ball being used (see Patent Document 1) and a self-standing inertia body being used (see Patent Document 2).

While the lock mechanism is activated in response to an acceleration acting in the horizontal direction being detected by the acceleration sensor in the seat belt retractor, the sensitivity of the acceleration sensor by which it activates the lock mechanism (the lock sensitivity) sometimes varies, depending on a direction of an acceleration acting on the vehicle. For example, a retractor built into a seatback of a vehicle is configured such that an acceleration sensor swings in accordance with a reclining angle of the seatback. Therefore, the lock sensitivity sometimes differs between a case in which an acceleration is generated in the swinging direction and a case in which an acceleration is generated in a direction orthogonal to the swinging direction. In addition, the lock sensitivity differs depending on the direction in which the acceleration acts, also in accordance with various conditions such as a shape and a non-locking angle of a lever (an actuating member) which is interposed between the acceleration sensor and the lock mechanism.

Because of this, if the specification of the acceleration sensor is determined uniformly based on a sensitivity in a direction in which the lock sensitivity becomes the lowest so that the sensitivity becomes sharp, a lock sensitivity in a direction orthogonal to the direction in which the lock sensitivity is low becomes too sharp, resulting in a fear that an early locking is caused in a non-locking performance.

Conventionally, in order to enable an adjustment of the lock sensitivity for each direction in which acceleration acts, there is known the acceleration sensor described in Patent Document 1 in which the ball type inertia body is used and an inclination angle of a ball receiving surface is made to differ in the each direction.
Patent Document 1: JP 10-157569 A
Patent Document 2: JP 2002-321595 A Meanwhile, in the acceleration sensor described in Patent Document 1 which uses the ball type inertia body, not only the inclination angle of the ball receiving surface but also an inclination angle of the lever needs to be set. In the acceleration sensor described in Patent Document 2 which uses the self-standing inertia body, no particular consideration is made for an adjustment depending on a direction in which an acceleration acts.

SUMMARY OF THE INVENTION

The present invention is made in view of the situations described above, and preferably to provide a seat belt retractor using an acceleration sensor of a self-standing inertia body type according to which a lock sensitivity can be well-balanced in all directions.

In at least one embodiment of the present invention, a seat belt retractor includes an acceleration sensor which detects an acceleration in a horizontal direction. A lock mechanism locks an extraction of a seat belt in accordance with the acceleration detected by the acceleration sensor. The acceleration sensor includes a sensor case including a supporting surface which is constantly maintained horizontal and a self-standing inertia body. The self-standing inertia body has a substantially cylindrical shape whose bottom surface is placed on the supporting surface, installed inside the sensor case in a self-standing condition, and which tilts when the acceleration of a certain level or more in the horizontal direction is exerted. An actuating member which, in accordance with a tilting movement of the self-standing inertia body, activates the lock mechanism to lock the extraction of the seat belt. An outer contour of a contact area, where the supporting surface of the sensor case and the bottom surface of the self-standing inertia body are in surface contact with each other, is configured such that a distance from a center axis of the self-standing inertia body to the outer contour differ, in a horizontal plane, in a first direction and in a second direction orthogonal to the first direction.

In one aspect, the sensor case is swingable about an axis in the second direction so as to constantly maintain the supporting surface horizontal, and the distance in the first direction is set shorter than the distance in the second direction.

In another aspect, clearance grooves are formed in the supporting surface of the sensor case on respective outer circumferential edges thereof in the first direction.

In yet another aspect, boundary portions between the supporting surface and the clearance grooves have a shape of a convexly curved surface.

In at least one other embodiment, a seat belt retractor includes an acceleration sensor which detects an acceleration in a horizontal direction. A lock mechanism locks an extraction of a seat belt in accordance with the acceleration detected by the acceleration sensor. The acceleration sensor includes a sensor case including a supporting surface which is constantly maintained horizontal. A self-standing inertia body having a substantially cylindrical shape whose bottom surface is placed on the supporting surface, installed inside the sensor case in a self-standing condition, and which tilts when the acceleration of a certain level or more in the horizontal direction is exerted. An actuating member which, in accordance with a tilting movement of the self-standing inertia body, activates the lock mechanism to lock the extraction of the seat belt. A plane of a contact area, where the supporting surface of the sensor case and the bottom surface of the self-standing inertia body are in surface contact with each other, includes first and second phases which are adjacent about a center axis of the self-standing inertia body or the sensor case, and a distance from the center axis to a circumference of the contact area is set to differ in the first and second phases.

In one aspect, the seat belt retractor further includes a third phase which is positioned, with respect to the second phase, on a side opposite the first phase such that a bisector of an angular range thereof is aligned with a bisector of an angular range of the first phase, and a fourth phase which is positioned between the first phase and the third phase, and the distance from the center axis to the circumference of the contact area in the first and third phases is set shorter than the distance in the second and fourth phases.

In another aspect, the angular range of the first phase is 180° or more.

In yet another aspect, the angular ranges of the first phase and the third phase differ from each other.

In still another aspect, a clearance groove is formed in the supporting surface of the sensor case on the circumference of the contact area in at least one of the first and third phases.

In another aspect, a boundary portion between the supporting surface and the clearance groove has a shape of a convexly curved surface.

ADVANTAGES OF THE INVENTION

According to at least one embodiment of a seat belt retractor in accordance with the invention, when an acceleration of a certain level or more is exerted on a vehicle, the self-standing inertia body tilts, and the actuating member is operated by the tilting of the self-standing inertia body to activate the lock mechanism to the locking side, whereby the extraction of the seat belt is locked. Here, the outer contour of the contact area, where the supporting surface of the sensor case and the bottom surface of the self-standing inertia body are in surface contact, is configured such that the distance from the center axis of the self-standing inertia body to the outer contour differ, in the horizontal plane, in the first direction and in the second direction which is orthogonal to the first direction. Accordingly, the self-standing inertia body becomes easier to tilt in the direction in which the distance is shorter. Therefore, when the lock sensitivity is desired to be modified to be sharp in the direction in which the lock sensitivity is low, the above-described distance in that direction can be set smaller than the distance in the direction which is orthogonal to that direction, so that the lock sensitivity is well-balanced in all directions.

Further, according to at least one embodiment of a seat belt retractor in accordance with the invention, a plane of a contact area, where the supporting surface of the sensor case and the bottom surface of the self-standing inertia body are in surface contact with each other, includes first and second phases which are adjacent about a center axis of the self-standing inertia body or the sensor case, and a distance from the center axis to a circumference of the contact area is set to differ in the first and second phases. Accordingly, the self-standing inertia body becomes easier to tilt in the direction of the phase in which the distance is shorter. Therefore, when the lock sensitivity is desired to be modified to be sharp in the phase in which the lock sensitivity is low, the above-described distance in that phase can be set smaller than the distance in the other phase, so that the lock sensitivity is well-balanced shape in all directions.

Here, the "contact area" implies a portion in a plane of the supporting surface of the sensor case or the bottom surface of the self-standing inertia body in which they are in contact with each other when no acceleration is detected and when the self-supporting member is self-standing. Further, the "phase" implies a sector area, in the plane of the contact area, having a certain center angle as viewed from a center where the center axis passes.

BRIEF DESCRIPTION OF THE DRAWINGS

FIG. 2A is a sectional view of an acceleration sensor taken along the direction of arrows II-II in FIG. 1.

FIG. 2B is another sectional view of the acceleration sensor taken along the direction of arrows II'-II' in FIG. 1.

BEST MODE FOR CARRYING OUT THE INVENTION

Figure 1:
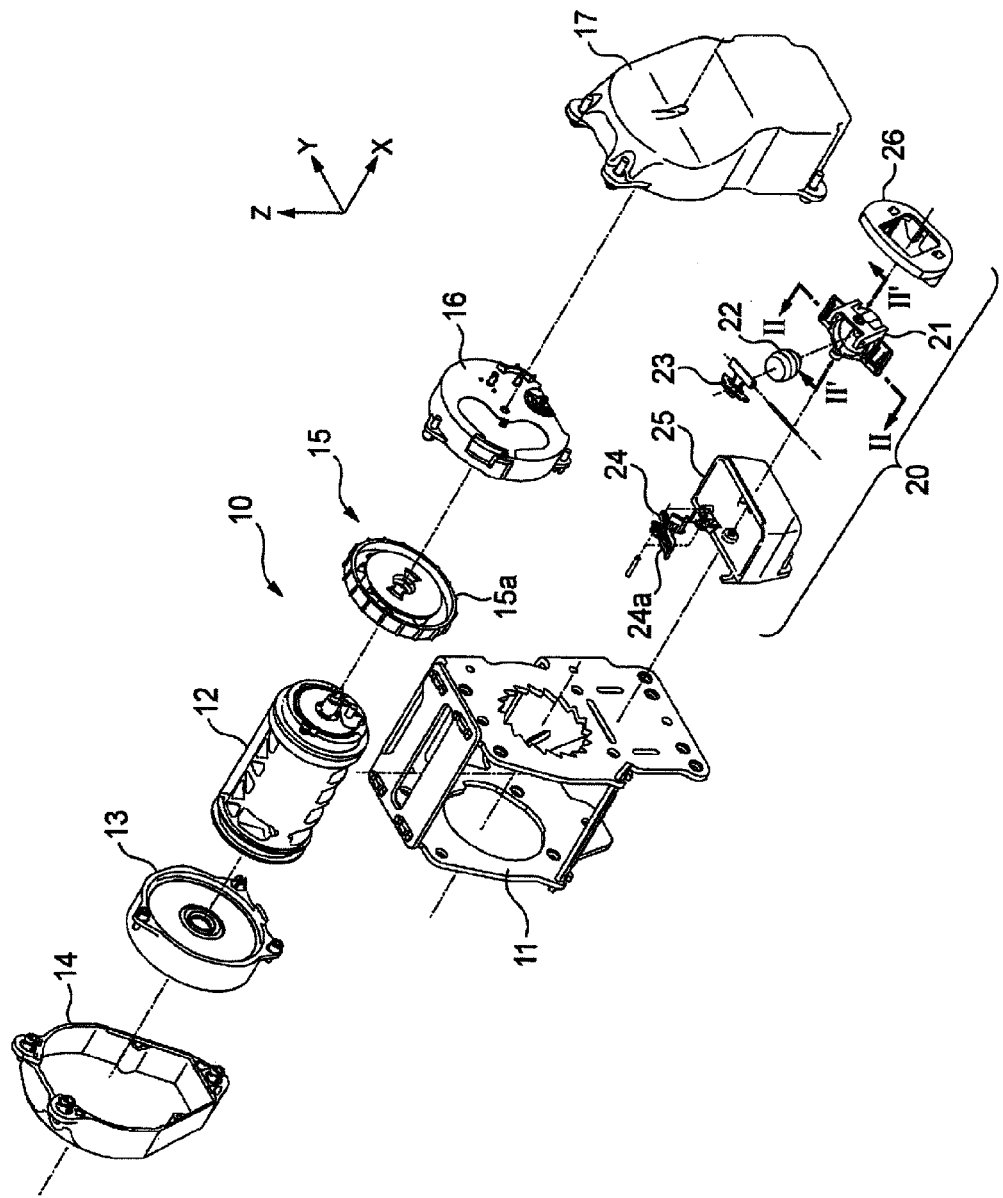
FIG. 1 is an exploded perspective view of a seat belt retractor of an embodiment of the present invention.

Hereinafter, a seat belt retractor according to an embodiment of the present invention will be described in detail with reference to the drawings. FIG. 1 is an exploded perspective view of the seat belt retractor, and FIGS. 2A and 2B are partial configuration diagrams of an acceleration sensor used in the seat belt retractor, in which FIG. 2A is a sectional view taken in the direction of arrows II-II in FIG. 1, and FIG. 2B is a sectional view taken in the direction of arrows II'-II' in FIG. 1.

The seat belt retractor 10 is adapted to be attached to a seatback (not shown) of a reclining seat, and includes a retractor frame 11. A spindle 12 is rotatably supported on the retractor frame 11 to wind a seat belt (not shown).

A retractor spring 13 is coupled to one axial end side of the spindle 12 to bias the spindle 12 in a direction in which the seat belt is to be wound. The retractor spring 13 is housed in a cover 14, and is attached to the retractor frame 11.

On the other axial end side of the spindle 12, a lock mechanism 15 and an acceleration sensor 20 are provided. The lock mechanism 15 locks an extraction of the seat belt. The acceleration sensor 20 detects an acceleration acting on a vehicle, and activates the lock mechanism 15 in accordance with the acceleration. The acceleration sensor 20 includes a sensor case 21, a self-standing inertia body 22 installed inside the case 21, a first lever 23 and a second lever 24 each serving as an actuating member, and a holder 25 which is fixed to the retractor frame 11 and swingably supports the sensor case 21. In the drawings, a reference numeral 16 denotes a bearing plate, and a reference numeral 17 denotes a sensor cover.

The sensor case 21 is attached to the holder 25 so as to be swingable about a horizontal axis (i.e., about an axis in a second direction which will be described later) which is parallel to an axial direction of the spindle 12 (an X direction in FIG. 1). A holder member 26 having a weight at a lower portion is attached to the sensor case 21, whereby a supporting surface 31 formed at a bottom portion of the sensor case 21 is constantly maintained horizontal irrespective of a reclining adjusted angle of the seatback.

As shown in FIGS. 2A and 2B, the self-standing inertia body 22 has a substantially cylindrical shape, including a small diameter portion 42 having a bottom surface 41 and a large diameter portion 44 having a guide surface 43 on an upper portion thereof. The self-standing inertia body 22 is installed inside the sensor case 21 in a self-standing condition by placing the bottom surface 41 on the supporting surface 31 of the sensor case 21 with centers being aligned. When a horizontal acceleration of a certain level or more is exerted, the self-standing inertia body 22 is allowed to tilt about a fulcrum located at a position lying in a direction of the acceleration and on an outer contour of a contact area CA (see FIG. 3C), where the supporting surface 31 and the bottom surface 41 are brought into surface contact with each other.

The first lever 23 is supported such that the first lever 23 swings about the axis in the X direction together with the sensor case 21, and such that the first lever 23 is swivelable, with respect to the sensor case 21, about an axis in a direction (a Y direction) orthogonal to the axial direction of the spindle 12. The second lever 24 is supported on the holder 25 so as to be swivelable about an axis in the X direction.

Accordingly, in accordance with a tilting movement of the self-standing inertia body 22 in either direction, a contact position between the guiding surface 43 of the self-standing inertia body 22 and a protruded portion 23a, whose distal end is spherical, is changed, whereby the first lever 23 swivels. The swiveled first lever 23 moves a pawl portion 24a of the second lever 24 upward so as to mesh into teeth 15a of the lock mechanism 15, whereby the lock mechanism 15 is activated to lock (lock ON).

Figure 3A:
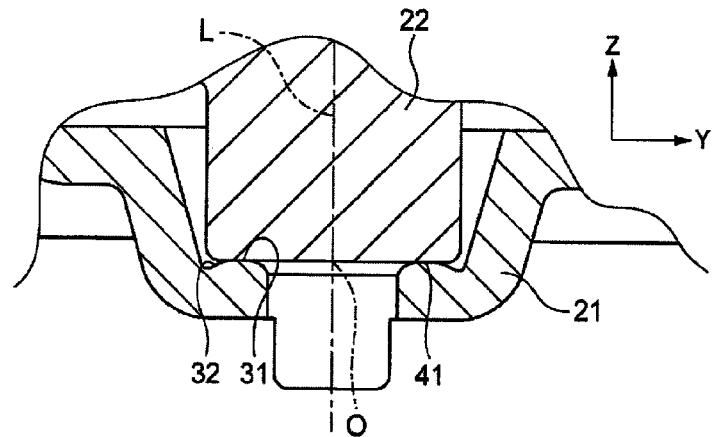
FIG. 3A is an enlarged view of a part of FIG. 2A.
Figure 3B:
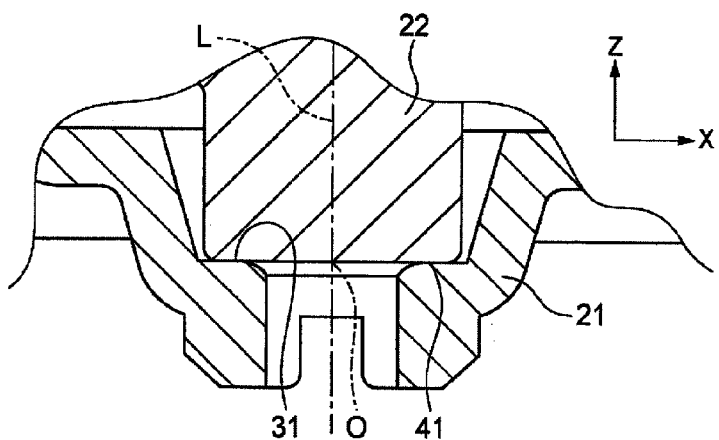
FIG. 3B is an enlarged view of a part of FIG. 2B.
Figure 3C:
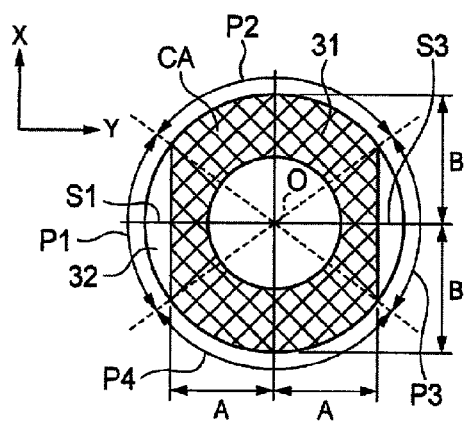
FIG. 3C is a diagram which illustrates a contact area between a supporting surface of a sensor case and a bottom surface of a self-standing inertia body.

Here, in this embodiment, as shown in FIGS. 3A to 3C, the outer contour of the contact area CA, where the supporting surface 31 of the sensor case 21 and the bottom surface 41 of the self-standing inertia body 22 are brought into surface contact with each other, is configured such that a distance from the center axis of the self-standing inertia body 22 to the outer contour differ, in a horizontal plane, in a first direction (the Y direction) and in a second direction (the X direction) orthogonal to the first direction.

More specifically, in this embodiment, a pair of clearance grooves 32 are formed in the supporting surface 31 of the sensor case 21, on respective outer circumferential edges thereof in the first direction (the Y direction), so as to extend parallel to each other along the X direction, whereby a distance A in the first direction (the Y direction) is set to be shorter than a distance B in the second direction (the X direction).

Figure 3D:
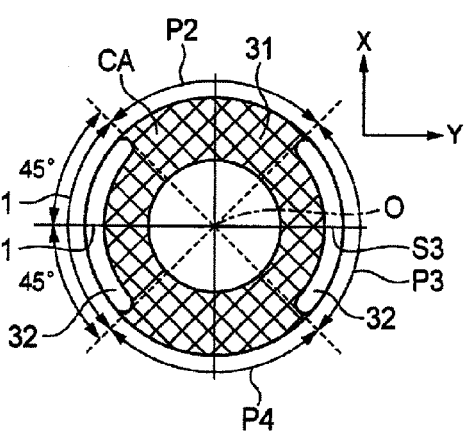
FIG. 3D is a diagram which illustrates a modified example of clearance grooves of FIG. 3C.

The clearance grooves 32 may be provided symmetrically along a direction of the circumference in a direction in which sensitivity is desired to be increased. For example, as is illustrated in FIG. 3(d), the clearance grooves 32 may be formed in an angular range of plus and minus 45° with respect to the Y direction. This angular range is designed in accordance with a required specification.

On the other hand, the bottom surface 41 of the self-standing inertia body 22 is a flat surface having a circular outer shape. Thus, the contact area CA shown in FIGS. 3C and 3D substantially has the shape of the supporting surface 31 of the sensor case 21.

Therefore, the self-standing inertia body 22 more easily tilts in the Y direction than in the X direction in which the sensor case 21 swings and the lock sensitivity is sharp, thereby making it possible to increase the lock sensitivity in the Y direction. The lock sensitivity in the X direction and in Y direction is adjusted by the size and shape of the clearance grooves 32.

As described above, according to the seat belt retractor 10 of the embodiment, when the acceleration of a certain level or more is exerted on the vehicle, the self-standing inertia body 22 tilts, and the first lever 23 and the second lever 24 are operated by the tilting of the self-standing inertia body 22 to activate the lock mechanism 15 to the locking side, whereby the extraction of the seat belt is locked. In doing so, the outer contour of the contact area CA where the supporting surface 31 of the sensor case 21 and the bottom surface 41 of the self-standing inertia body 22 are brought into surface contact is configured such that, by providing the clearance grooves 32, the distance from the center axis O of the self-standing inertia body 22 to the outer contour differ, in the horizontal plane, in the first direction (the Y direction) and in the second direction (the X direction) which is orthogonal to the first direction. Accordingly, the self-standing inertia body 22 more easily tilts in the direction of the shorter distance.

Therefore, when the lock sensitivity is desired to be modified to be sharp in the first direction (the Y direction) in which the lock sensitivity is low, the above-described distance in the first direction can be set shorter than the distance in the second direction (the X direction) which is orthogonal thereto, so that the generation of early locking is prevented, and the lock sensitivity is made well-balanced in all directions.

To describe the embodiment from the viewpoint of phase, a plane of the contact area CA, where the supporting surface 31 of the sensor case 21 and the bottom surface 41 of the self-standing inertia body 22 are brought into surface contact, includes first and second phases P1, P2 which are adjacent to each other about the center axis O of the self-standing inertia body 22 or the sensor case 21. A third phase P3 which is positioned, with respect to the second phase P2, on a side opposite the first phase P1 such that a bisector S3 of an angular range thereof is aligned with a bisector S1 of an angular range of the first phase P1, and a fourth phase P4 which is positioned between the first phase P1 and the third phase P3.

In this case, the clearance grooves 32 are formed on the circumference of the contact area CA in the first and third phases P1, P3. Accordingly, a distance from the center axis O to the circumference of the contact area CA in each of the first and third phases P1, P3 is set shorter than the distances B in the second and fourth phases P2, P4. Thus, the self-standing inertia body 22 more easily tilts in the first and third phases P1, P3 than in the second and fourth phases P2, P4 in which the sensor case 21 swings and the lock sensitivity is sharp, so that the lock sensitivity in the first and third phases P1, P3 is increased.

Therefore, when the lock sensitivity is desired to be modified to be sharp in the first and third phases P1, P3 where the lock sensitivity is low, the above-described distance in the first and third phases P1, P3 can be set shorter than the distance in the second and fourth phases P2, P4, so that the lock sensitivity can be made well-balanced in all directions.

Meanwhile, the present invention is not limited to the embodiment described above, and changes and modifications can optionally be made therein.

Figure 4A:
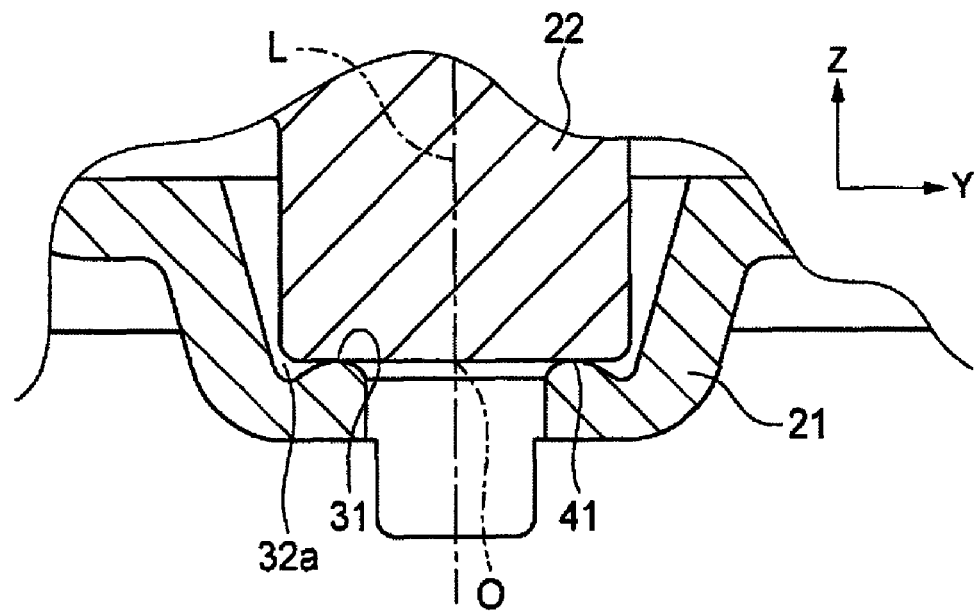
FIG. 4A is an enlarged sectional view of the acceleration sensor having another modified example of clearance grooves.
Figure 4B:
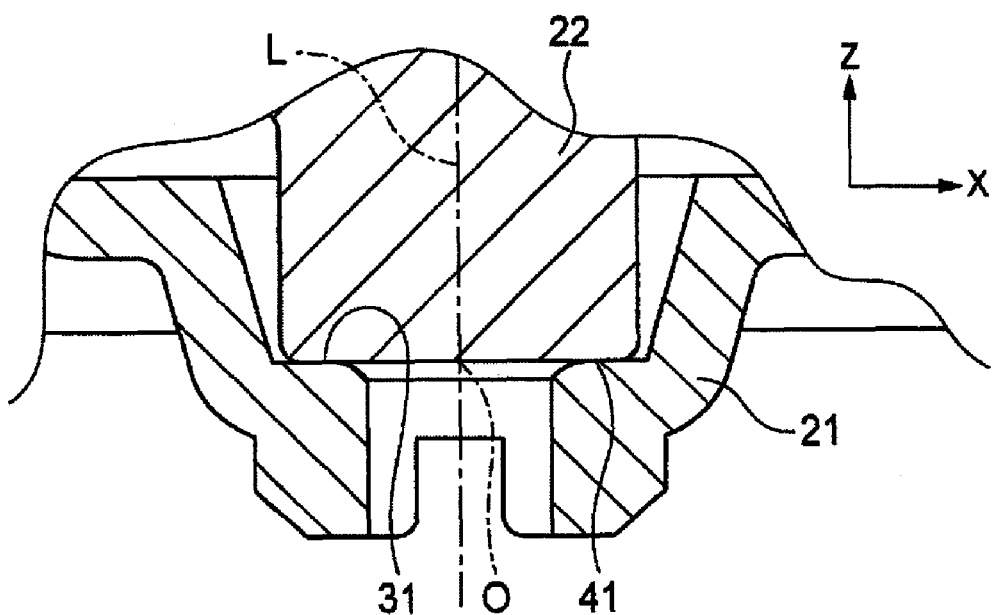
FIG. 4B is another enlarged sectional view of the acceleration sensor of FIG. 4A.

For example, the shape of the clearance groove 32 is not limited to those of the embodiment described above. For instance, the clearance grooves 32a as shown in FIGS. 4A and 4B may have a boundary portion with the supporting surface 31 that includes a shape of a convexly curved surface. In this case, the tilting of the self-standing inertia body 22 can be made smooth.

Figure 5A:
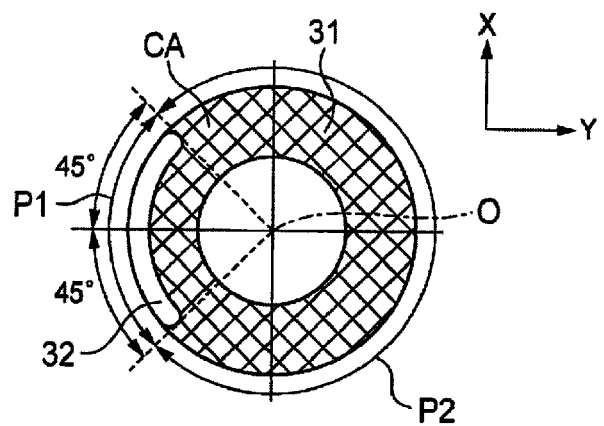
FIG. 5A is a diagram which illustrates a modified example of the contact area.

Further, the contact area CA which is configured by the clearance grooves 32 may be modified variously in accordance with required lock sensitivity. For example, like a modified example shown in FIG. 5A, a clearance groove 32 may be provided at only one portion of the supporting surface 31 of the sensor case 21, so that, in a plane of the contact area CA, a distance from a center axis O to a circumference of the contact area CA in the first phase P1 becomes shorter than the distance in a second phase P2 which is adjacent to the first phase P1.

Figure 5B:
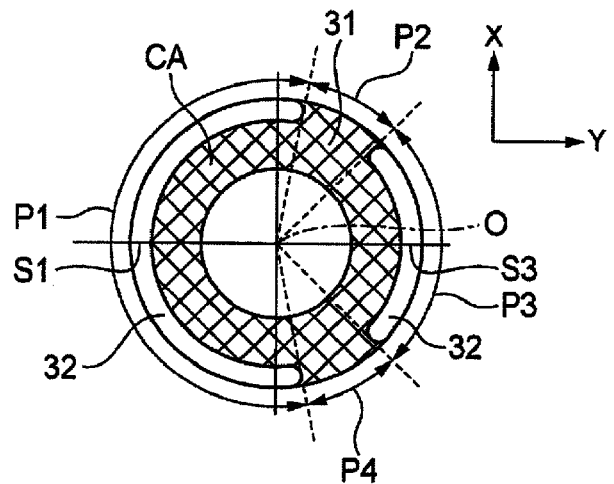
FIG. 5B is a diagram which illustrates another modified example of the contact area.

Further, another modified example is shown in FIG. 5B, where the angular ranges of a first phase P1 and a third phase P3 may be set to differ from each other. In addition, as shown in the same figure, the angular range of the first phase P1 may be set to be 180° or more.

Figure 5C:
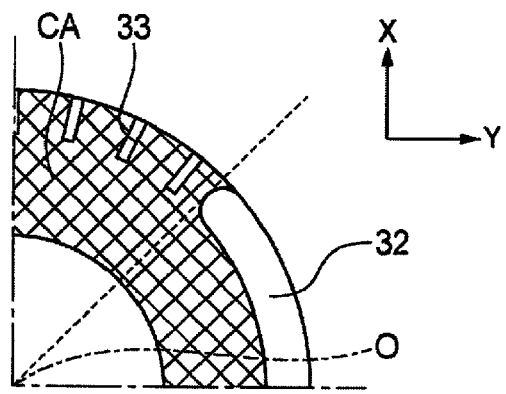
FIG. 5C is a diagram which illustrates a yet another modified example of the contact area.

In addition, yet another modified example is shown in FIG. 5C where the slits 33 may be formed in a portion of a supporting surface 41 corresponding to the second and fourth phases having no clearance groove 32, thereby improving the overall lock sensitivity.

Furthermore, while the distance from the center axis O to the outer contour of the contact area CA are made to differ in directions or phases by providing the pair of clearance grooves 32 in the supporting surface 31 of the sensor case 21 in the various embodiments, when the self-standing inertia body 22 is configured to not rotate about the center axis O, instead of providing the pair of clearance grooves 32, the bottom surface 41 of the self-standing inertia body 22 may be partially chamfered to make the distance from the center axis O to the outer contour of the contact area CA different in directions or phases.

The present application is based on Japanese Patent Application (Patent Application No. 2007-187116) filed on Jul. 18, 2007, the entire content of which is incorporated herein by reference.

As a person skilled in the art will appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. A seat belt retractor comprising:
an acceleration sensor which detects an acceleration in a horizontal direction; and
a lock mechanism which locks an extraction of a seat belt in accordance with the acceleration detected by the acceleration sensor,
wherein the acceleration sensor comprises:
a sensor case comprising a flat supporting surface which is constantly maintained horizontal;
a self-standing inertia body having a substantially cylindrical shape with a flat bottom surface, which is placed on the supporting surface, the self-standing inertia body being installed inside the sensor case in a self-standing condition and tilting when the acceleration of a certain level or more in the horizontal direction is exerted; and
an actuating member which, in accordance with a tilting movement of the self-standing inertia body, activates the lock mechanism to lock the extraction of the seat belt,
wherein a shape of an outer perimeter of the supporting surface and a shape of an outer perimeter of the bottom surface are different from each other, and
wherein the outer perimeter of one of the supporting surface and the bottom surface is configured such that a distance from a center axis of the self-standing inertia body to the outer perimeter of said one of the supporting surface and the bottom surface differs, in a horizontal plane, in a first direction and in a second direction orthogonal to the first direction.

2. The seat belt retractor as set forth in claim 1, wherein the sensor case is swingable about an axis in the second direction so as to constantly maintain the supporting surface horizontal, and
the distance in the first direction is set shorter than the distance in the second direction.

3. The seat belt retractor as set forth in claim 1, wherein the sensor case further comprises a clearance groove arranged adjacent to the outer perimeter of the supporting surface in the first direction.

4. The seat belt retractor as set forth in claim 3, wherein the clearance groove comprises a convexly curved surface having a boundary with the supporting surface.

5. A seat belt retractor comprising:
an acceleration sensor which detects an acceleration in a horizontal direction; and
a lock mechanism which locks an extraction of a seat belt in accordance with the acceleration detected by the acceleration sensor,
wherein the acceleration sensor comprises:
a sensor case comprising a flat supporting surface which is constantly maintained horizontal;
a self-standing inertia body having a substantially cylindrical shape whose bottom surface is placed on the supporting surface, installed inside the sensor case in a self-standing condition, and which tilts when the acceleration of a certain level or more in the horizontal direction is exerted; and
an actuating member which, in accordance with a tilting movement of the self-standing inertia body, activates the lock mechanism to lock the extraction of the seat belt,
wherein a shape of an outer perimeter of the supporting surface and a shape of an outer perimeter of the bottom surface are different from each other, and
wherein a plane of a contact area, where the supporting surface of the sensor case and the bottom surface of the self-standing inertia body are in surface contact with each other, comprises first and second phases which are adjacent about a center axis of the self-standing inertia body or the sensor case, and a distance from the center axis to the outer perimeter of one of the supporting surface and the bottom surface is set to differ in the first and second phases.

6. The seat belt retractor as set forth in claim 5, wherein the plane of the contact area further comprises a third phase which is positioned, with respect to the second phase, on a side opposite the first phase such that a bisector of an angular range thereof is aligned with a bisector of an angular range of the first phase, and a fourth phase which is positioned between the first phase and the third phase, and
the distance from the center axis to the outer perimeter of the one of the supporting surface and the bottom surface in the first and third phases is set shorter than the distance in the second and fourth phases.

7. The seat belt retractor as set forth in claim 5, wherein the angular range of the first phase is 180° or more.

8. The seat belt retractor as set forth in claim 6, wherein the angular ranges of the first phase and the third phase differ from each other.

9. The seat belt retractor as set forth in claim 5, wherein the sensor case further comprises a clearance groove arranged adjacent to the outer perimeter of the supporting surface in at least one of the first and third phases.

10. The seat belt retractor as set forth in claim 9, wherein the clearance groove comprises a convexly curved surface having a boundary with the supporting surface.

* * * * *